(No Model.)

H. J. SCHULTE.
APPARATUS FOR SPRAYING LIQUIDS.

No. 587,662. Patented Aug. 3, 1897.

WITNESSES.
James Gardiner.
H. S. Rollins.

INVENTOR.
Henry John Schulte.
BY John Day.
ATTORNEY.

UNITED STATES PATENT OFFICE.

HENRY JOHN SCHULTE, OF LOS ANGELES, CALIFORNIA.

APPARATUS FOR SPRAYING LIQUIDS.

SPECIFICATION forming part of Letters Patent No. 587,662, dated August 3, 1897.

Application filed August 25, 1896. Serial No. 603,851. (No model.)

*To all whom it may concern:*

Be it known that I, HENRY JOHN SCHULTE, of the city of Los Angeles, in the county of Los Angeles and State of California, have invented certain new and useful Improvements in Apparatus for Spraying Liquids, of which the following is a full, clear, and exact description or specification, reference being had to the annexed sheet of drawings and to the letters marked thereon.

My invention, which relates to apparatus for spraying liquids, is more especially designed for and adapted to the spraying of water upon lawns and for purposes of irrigation, but it may also be used in other situations and for other purposes where the spraying of liquids is necessary—such, for example, as in distributing a liquid in an atomized or pulverized condition, sometimes employed in manufacturing operations—such, for example, as the moistening or batching of jute and other fibers used in textile manufactures.

My improved apparatus for spraying liquids consists of a nozzle which is screwed onto the screwed portion of the coupling used, with flexible hose-pipe employed for conveying and distributing water or other liquids. This nozzle is made with an opening at its outer end, and across the lower part thereof there is a bridge-piece for carrying a central cylindrical stem, which stem projects through the opening in the outer end of the nozzle and to some distance beyond said hole. Upon this projecting portion of its cylindrical stem a tube is carried, the said tube being formed tapered at its lower end and provided with one or more helical or screw-propeller blades, so that the water issuing under pressure from the opening in the outer end of the nozzle strikes against the helical blades and produces rapid rotation of the screw-propeller. The effect of this rotation of the screw-propeller, caused by the forcible flow of water or other liquid against it, is to impart a rotary motion to the water as well as to break it up into spray, the centrifugal action of the rotation causing the atomized or pulverized water to be widely distributed over the ground or other surface to be sprayed or irrigated.

Figure 1:
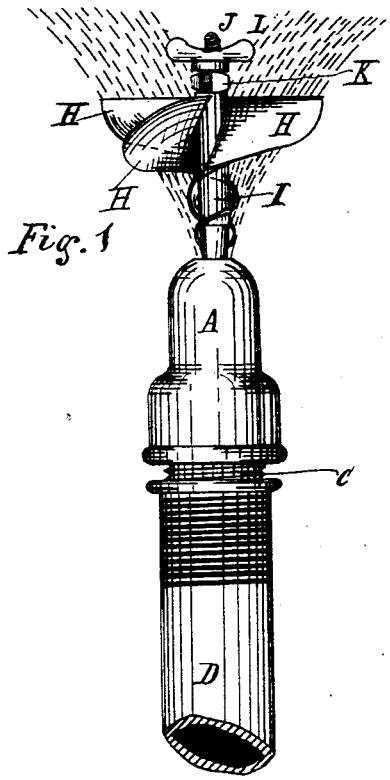
Figure 2:
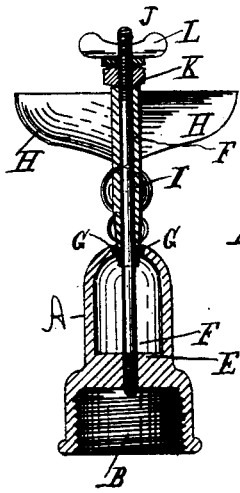
Figure 3:
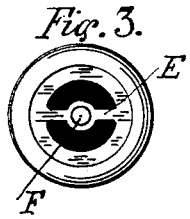
Figure 4:
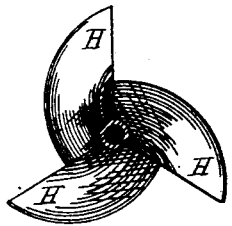

On the inclosed sheet of drawings, Figure 1 is a side elevation of my apparatus. Fig. 2 is a transverse section of the same. Fig. 3 is an inverted plan of the lower part of the nozzle, showing the bridge-piece to which the central cylindrical stem is attached. Fig. 4 is a detached plan of the screw-propeller.

In the figures the nozzle is marked A and is shown more particularly at Fig. 2. Its lower part is formed with a tubular screw-thread B in order to attach to or engage with the screw-thread C, Fig. 1, of the coupling in the end of the flexible hose-pipe D.

Across the lower part of the nozzle A the bridge-piece E is situated, as shown in Figs. 2 and 3. This bridge-piece carries the cylindrical stem F, which may be attached thereto by means of a screw, as shown at Fig. 2, or the stem F may be driven tight, so as to hold it firmly in the bridge E, or the stem F may be held in the bridge-piece by solder.

An annular space G is formed by the cylindrical stem F passing through the opening in the top of the nozzle A, as shown at Fig. 2, and through this space the water flowing under pressure from the pipe D escapes and strikes against the helical blades H of the screw-propeller, whereby the said screw-propeller is caused to rotate, thereby imparting centrifugal motion to the water and at the same time breaking it up into spray, as indicated by the dotted lines in Fig. 1.

The lower part of the tubular stem I of the screw-propeller is made conical, and according to the extent to which this conical portion enters the annular space G so the extent of opening of the annular space is regulated, and the quantity of water escaping therethrough is varied at pleasure, corresponding to the requirements of any and every particular use.

For the purpose of adjusting the extent to which the conical end of the tube I enters the opening G the stem F is formed at its outer end with the screw J, fitted with a nut K and winged jam-nut L, so that by screwing the nut K upward or downward upon the stem J the dimensions of the annular opening G, and therefore the quantity of water flowing therethrough, are or may be from time to time regulated. When the nut K has been adjusted to its required position, the winged jam-nut L is screwed down upon it, so as to retain the nut K in that position.

Having now described the nature of my said invention and the best system, mode, or manner I am at present acquainted with for carrying the same into practical effect, I desire to observe, in conclusion, that what I consider to be novel and original, and therefore claim as the invention to be secured to me by Letters Patent, is as follows:

1. In apparatus for spraying liquids wherein a screw-propeller is used, the conical lower end of the propeller-tube which passes into the nozzle from which the water escapes and the adjusting-nuts in connection therewith for regulating the depth of projection of the conical part into the escaping hole of the nozzle whereby the quantity of water issuing from the spraying apparatus is regulated, substantially as set forth.

2. As an improved apparatus for spraying liquids the combination of the nozzle, the bridge, the central stem, the screw-propeller, the conical lower end of the propeller-tube, the adjustable annular space whereinto the conical end of the propeller-tube passes, the nuts for adjusting the position of the propeller, all operating together in the manner and for the purposes substantially as set forth.

In testimony whereof I, the said HENRY JOHN SCHULTE, have hereunto set my hand in the presence of two subscribing witnesses.

HENRY JOHN SCHULTE.

Witnesses:
JAMES GARDINER,
ST. JOHN DAY.